United States Patent [19]
Pemberton

[11] Patent Number: 4,726,234
[45] Date of Patent: Feb. 23, 1988

[54] CONNECTOR AND VALVE FOR FLUID CONDUITS

[76] Inventor: J. C. Pemberton, 9920 Sunset Ave., LaMesa, Calif. 92120

[21] Appl. No.: 909,449

[22] Filed: Sep. 19, 1986

[51] Int. Cl.⁴ .................................................. G01L 7/00
[52] U.S. Cl. ......................................... 73/756; 73/147; 137/271; 137/595
[58] Field of Search ................... 73/756, 147; 251/5; 137/270, 271, 594, 595, 568; 285/137.1

[56] References Cited

U.S. PATENT DOCUMENTS

| | | | |
|---|---|---|---|
| 2,390,534 | 12/1945 | Heuver | 73/756 |
| 2,492,149 | 5/1949 | Heuver | 251/5 |
| 2,517,820 | 4/1950 | Aagard | 50/11 |
| 2,582,917 | 3/1952 | Aagard | 251/5 |
| 3,018,793 | 2/1962 | Aagard | 137/595 |
| 3,076,473 | 5/1963 | Wadey | 137/270 |
| 3,403,561 | 10/1968 | List et al. | 73/756 |
| 3,438,260 | 4/1969 | Kowal et al. | 73/756 |
| 3,678,752 | 7/1972 | Dellert | 73/756 |
| 3,820,828 | 3/1974 | Fiddler | 285/137 R |
| 3,934,605 | 9/1976 | Legris | 137/271 |
| 4,007,952 | 8/1977 | Fiddler | 285/137 R |

Primary Examiner—Donald O. Woodiel
Attorney, Agent, or Firm—Jessup, Beecher & Slehofer

[57] ABSTRACT

A plurality of parallel rows of short flexible tubes lead from a housing. Each row is provided with an elongate bar in which each tube is provided with a transverse fluid passage leading to a port by means of which the respective tube may be connected to an outside fluid conduit. Each elongate bar, by virtue of the flexibility of the tubes, may be pivoted to one side, thereby giving access to connections at interior bars. The structure has particular utility in a system where a plruality of fluid pressure pickups are fed to individual pressure measuring transducers in the housing. Partitions and actuating bladders are interposed between the flexible tubes, so that inflation of a given bladder will pinch off a row of flexible tubes and allow a selected group or row of tubes to be selectively connected to the pickups. In this way a limited number of transducers in the housing may be used to successively measure a much larger number of fluid pressure pickup points, by time sharing use of the transducers.

7 Claims, 6 Drawing Figures

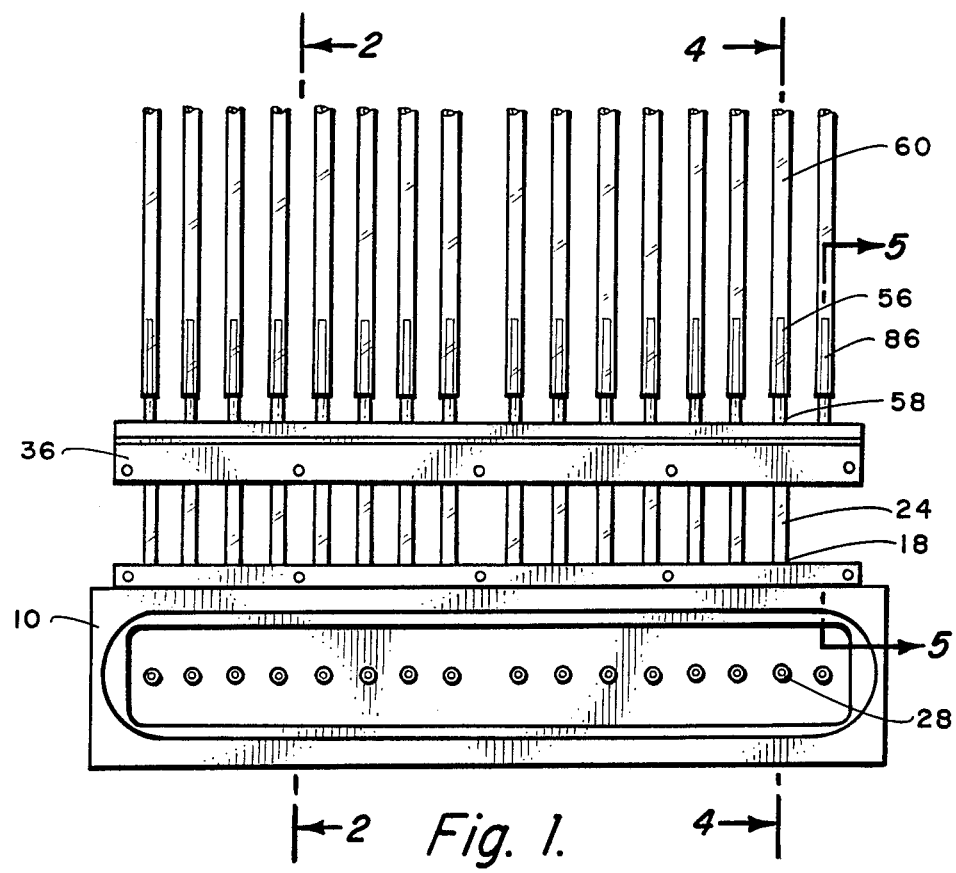
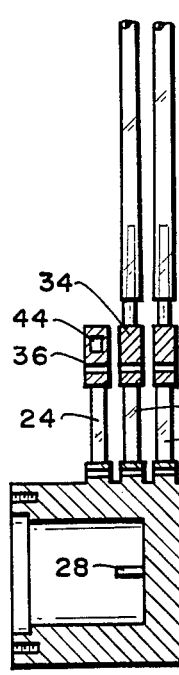
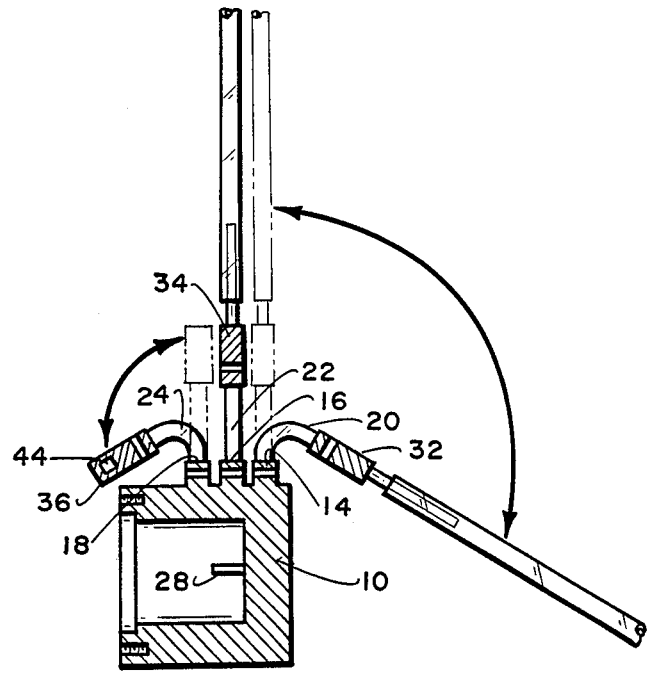
Fig. 1.
Fig. 2.
Fig. 3.

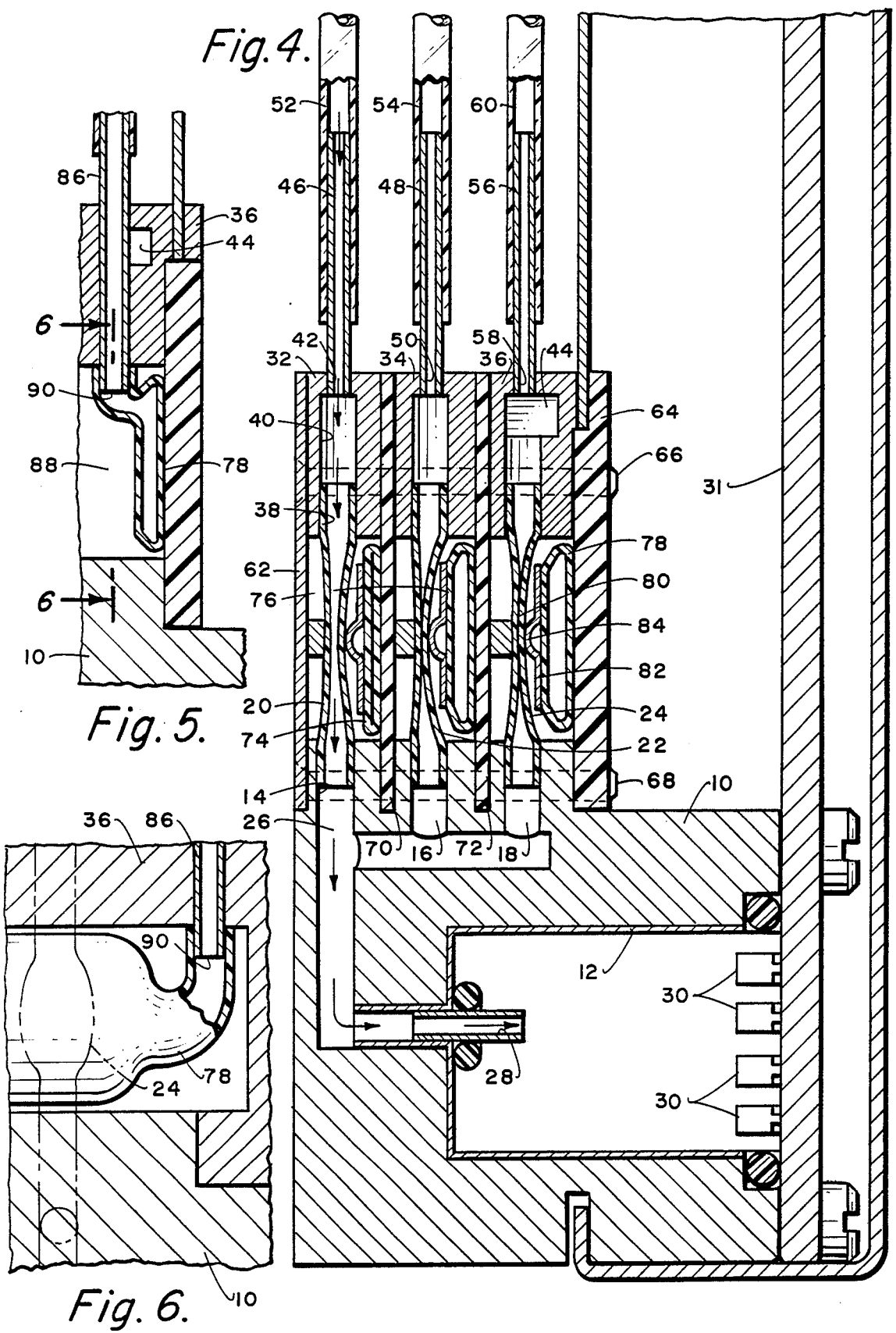

CONNECTOR AND VALVE FOR FLUID CONDUITS

SUMMARY OF THE INVENTION

This invnetion is a fluid conduit connector, and particularly a connector used for successively connecting banks of fluid pressure pickup points to a series of pressure transducers, the pickup points being grouped in multiples of the number of transducers. The object of the invention is to provide a structure which is very compact and which allows a given number of pressure transducers to be used in the measurement of a larger number of pressure pickup points. The configuration, while optimizing the compactness of the structure, is such that ready access is provided to those portions of the structure needed for assembly and repair.

BRIEF DESCRIPTION OF THE DRAWINGS

FIG. 1 is an elevational view of the connector in an intermediate state of assembly.

FIG. 2 is a cross section taken on line 2—2 in FIG. 1.

FIG. 3 is a view figure similar to FIG. 2 illustrating a significant feature of the invention which greatly facilitates assembly and repair.

FIG. 4 is a cross section, enlarged, taken on line 4—4 in FIG. 1.

FIG. 5 is a partial cross section taken on line 5—5 in FIG. 1.

FIG. 6 is a partial elevational section taken on line 6—6 in FIG. 5.

DESCRIPTION OF THE INVENTION

In the drawings 10 indicates a mounting member consisting, in this, case of a housing which contains a row (e.g. fifteen) of fluid pressure transducers 12. Each transducer 12 is ducted to a corresponding rank of three parallel rows of ports; each row containing fifteen ports. The fifteenth rank of the three rows of ports is shown in FIG. 4, at 14, 16 and 18. Connected to the respective ports and extending upwardly therefrom (FIG. 2) are three rows of flexible conduits or tubes, exemplified by the tubes 20, 22, and 24.

Fluid pressure at any of the ports 14, 16, and 18 is applied through passage 26 in the housing 10, through the port 28, to the transducer 12, where it is converted to an electric signal output at 30. Signals representative of the measured pressures are stored and processed in IC's mounted on the circuit board 31, which employ technology forming no part of this invention.

Each of the three rows of ports represented by 14, 16 and 18 has a corresponding elongate mounting member or bar 32, 34 and 36, each provided with a row of pairs of ports connected by a transverse passage. The numeral 38 indicates the lower port in the mounting bar 32 which communicates through the transverse passage 40 with the upper port 42.

The mounting bars 32 and 34 are substantially identical, each being provided with a row of fifteen transverse passages (e.g. 40) which interconnect the ports exemplified by 38 and 42. The mounting bar 36 is different, in that it is hollow with an elongate plenum or manifold 44 running the length of the bar, which communicates with all of the fifteen connecting tubes 24 that extend down into the housing 10.

The first two mounting bars 32 and 34 have nipples, exemplified at 46 and 48, extending from the respective fifteen upper ports 42 and 50. Pressed over the nipples 46 and 48 are respective fifteen external tubes 52 and 54. These thirty tubes lead to thirty fluid pressure pickup points or sensors, such as would be employed in a wind tunnel.

The third mounting bar 36, housing the manifold 44, is provided with a single nipple 56 pressed into a single upper port 58 and connected to a single external tube 60, which is fed with a known calibration pressure.

A major utility for the structure thus far described is to permit a plurality, in this case thirty, of fluid pressure sensors or pickup points to be connected in two phases, successively, to fifteen transducers 12, thereby effecting a time sharing arrangement, in which the number of transducers may be a submultiple of the number of pickup points located in a test apparatus, such as a wind tunnel. To effectuate this, the fifteen transducers 12 are connected successively to the thirty sensing points in two banks or phases of fifteen each, corresponding to the ports 14 and 16.

To this end the mounting bars 32, 34, and 36 are sandwiched together between sidewalls 62 and 64 (FIG. 5) and held in position by mounting screws 66 and 68 passing transversely through the sandwich. Partitions 70 and 72 are interposed between mounting bars 32/34 and 34/36, respectively. Interposed between the wall/partitions and the flexible tubes 20, 22, and 24 are respective three substantially identical, elongate, relatively flat valve-actuating bladders 74, 76 and 78. For example, the bladder 74 is interposed between the partition 70 and the adjacent flexible tube 20. When bladder 74 is deflated, as shown in FIG. 5, the passage through tube 20 is open, giving communication between the exterior tube 52 and the transducer 12 by way of the passage 26. When the bladder is inflated, exemplified at 76, the tube is pinched off, blocking fluid communication to transducer 12.

To concentrate the force of the inflated bladder, and hence increase the pressure to pinch off the tube, an elongate member in the form of a rectangular wire 80 is interposed between each row of tubes exemplified at 24, and the adjacent partition, exemplified at 72, approximately midway between the housing 10 and the bar 36. On the opposite side of the tube 19 a similar pressure enhancing member is interposed between the bladder 78 and the tube 24. This member consists of an elongate, flat sheet of metal or plastic 82 having a longitudinal boss 84 formed therein which cooperates with the opposite wire 80 to pinch off the tube 24 at its center.

Each of the bladders 74, and 76 has associated with it similar structures as described above and operates in a similar way. In FIG. 4 the bladders 76 and 78 are shown inflated, thereby pinching off tubes 22 and 24. The fifteen tubes in the first row, represented by tube 20, are not pinched off, because the bladder 74 is deflated, leaving the tube 20 open to provide communication between 52 and 12.

To inflate (and deflate) the respective three bladders 74, 76, and 78, each mounting bar is provided with a sixteenth nipple which passes transversely through the bar and communicates with a respective bladder. This structure is shown in FIG. 5 for the third bar; the other two being of similar configuration. The sixteenth nipple 86 passes transversely completely through the bar 36 into the region 88 between the member 36 and the housing 10, the region in which the bladder 78 is located. A nipple 90 is formed on the end of the bladder 78 and is pressed over the end of the nipple 86, so that fluid pressure applied from nipple 86 will inflate the bladder 78 to the attitude or position shown in FIG. 4. When the pressure in 86 is relieved, the bladder 78 collapses, opening the tube 24 and placing the external tube 60 in communication with the transducers 12.

In use, each of the fifteen tubes in the first row represented by tube 20 is connected to a corresponding pressure pickup point or sensor as, for example, pickup points disposed in a wind tunnel. The second row of tubes represented by 22 is connected to fifteen different sensors or pickup points. Thus there are a total of 30 pickup points to be measured. These are measured in two stages by the fifteen transducers represented at 12. This is done by inflating bladders 76 and 78 as shown in FIG. 4, thereby allowing only the fifteen tubes in the first row 20 to be in communication with the respective fifteen transducers 12 located in the housing 10. In the second stage of operation the bladder 74 is inflated while bladder 76 is deflated, bladder 78 remaining inflated. This now places the second row of fifteen tubes 22 in communication with the same fifteen transducers 12, and a reading is taken of the second bank of fifteen pickup points.

To calibrate the fifteen transducers 12 a known calibration pressure is applied to the tube 60, the bladders 74 and 76 are inflated and the bladder 78 is deflated. This places the pressure in 60 in communication with the manifold 44 and with each of the fifteen third row tubes 24 and thence via each of the passages 26 to each of the fifteen transducers 12. After calibration, the tubes 24 are pinched off by the bladder 78 and the two stages of pressure reading through the respective rows 20 and 22 are measured.

FIGS. 1, 2 and 3 show the present apparatus in an intermediate stage of assembly and demonstrate the advantages of this invention in facilitating assembly and repair.

For example, to gain access to the second row of ports 16 which receive the tubes 22, it is only necessary to bend the first and third mounting members 32 and 36 outwardly, as shown in FIG. 3. This is readily done because of the flexibility of the tubes 20 and 24. After securement or repair as required has been made of the second row of tubes 22, the apparatus is returned to its orthogonal position as shown in FIG. 2. Thereafter, the partitions, e.g. 70, bladders, e.g. 74, pressure members e.g., 80 and 82, are inserted into position and enclosed by the walls 62 and 64. The sandwich is then held together by the screws 66 and 68. If repair is required, it is only necessary to reverse the process, removing the partitions and associated parts, exposing the tubes as shown in FIG. 2, bending the outer tubes to one side as shown in FIG. 3, giving ready access to the center or second row 22 as shown in FIG. 3.

While this invention has been described employing only three rows of tubes and three mounting bars, it is clear that it may be adapted for any number of rows with any number of corresponding mounting bars. For repair or assembly it is only necessary to bend outward the rows on each side of the interior row where work is to be done, and then return the deflected rows to their upright position.

What is claimed is:

1. Connector for fluid conduits comprising:
a first mounting member having a plurality of rows of first ports;
a plurality of rows of flexible conduits having their proximal ends secured to said first mounting member in fluid communication with respective said first ports, said conduits projecting outwardly of said first mounting member;
a plurality of elongate second mounting members, one for each said row of said first ports, each having a row of pairs of transverse ports corresponding to said flexible conduit;
the distal end of each said conduit being secured to a respective said second mounting member and in fluid communication with a respective one of said pairs of transverse ports;
transverse fluid passage means respectively connecting each of said pairs of transverse ports;
said conduits being manually bendable to give access to said rows of first ports for connecting said conduits to said first ports and then returned substantially to an attitude projecting outwardly of said first mounting member.

2. Connector for fluid conduits comprising:
a first mounting member having a plurality of rows of first ports;
a plurality of rows of flexible conduits having their proximal ends secured to said first mounting member in fluid communication with respective said first ports, said conduits projecting outwardly of said first mounting member;
a plurality of elongate second mounting members, one for each said row of said first ports, each having a row of pairs of transverse ports corresponding to said flexible conduits;
the distal end of each said conduit being secured to a respective said second mounting member and in fluid communication with a respective one of said pairs of transverse ports;
transverse fluid passage means respectively connecting each of said pairs of transverse ports;
a plurality of rows of nipples corresponding to said rows of transverse ports;
each said nipple being in communication with a corresponding other of said pairs of ports;
said conduits being manually bendable to give access to said rows of first ports for connecting said conduits to said first ports and then returned substantially to an attitude projecting outwardly of said first mounting member.

3. Connector and valve for fluid conduits comprising:
a first mounting member having a plurality of rows of first ports;
a plurality of rows of flexible conduits having their proximal ends secured to said first mounting member in fluid communication with respective said first ports, said conduits projecting outwardly of said first mounting member;
a plurality of elongate second mounting members, one for each said row of first ports, each having a row of pairs of transverse ports corresponding to said flexible conduits;
the distal end of each said conduit being secured to a respective said second mounting member and in fluid communication with a respective one of said pairs of transverse ports;
transverse fluid passage means respectively connecting each of said pairs of ports;
said conduits being manually bendable to give access to said rows of first ports for connecting said conduits to said first ports and then returned substantially to an attitude projecting outwardly of said first mounting member;

a plurality of rows of partitions paralleling and separating said rows of flexible conduits;

a plurality of elongate, inflatable bladders paralleling said rows of flexible conduits, located between a row of flexible conduits and a partition;

whereby inflation of a bladder pinches off the adjacent row of flexible conduits and blocks fluid communication therethrough.

4. Connector and valve in accordance with claim 3 including:

a first elongate member interposed between a said bladder and the adjacent row of flexible conduits, and a second elongate member located on the opposite side of said adjacent row of flexible conduits, thereby concentrating the pressure on said conduits as said bladders are inflated to enhance said blocking of said fluid communication.

5. Apparatus for measuring a plurality of fluid pressures comprising:

a housing member having a plurality of rows of first ports;

a plurality of pressure transducers for converting fluid pressure into an output signal;

passage means connecting said transducers to certain respective said first ports;

a plurality of rows of flexible conduits having their proximal ends secured to said housing in fluid communication with respective said first ports, said conduits projecting outwardly of said housing;

a plurality of elongate mounting members, one for each said row of first ports, each having a row of pairs of transverse ports corresponding to said flexible conduits;

the distal end of each said conduit being secured to a respective said mounting member fluid communication with a respective one of said pairs of transverse ports;

transverse fluid passage means respectively connecting each of said pairs of transverse ports;

said conduits being manually bendable to give access to said rows of first ports for connecting said conduits to said first ports and then returned substantially to an attitude projecting outwardly of said first mounting member;

a plurality of rows of partitions paralleling and separating said rows of flexible conduits;

a plurality of elongate, inflatable bladders paralleling said rows of flexible conduits, located between a row of flexible conduits and a partition;

whereby inflation of a bladder pinches off the adjacent row of flexible conduits and blocks fluid communication therethrough.

6. Apparatus in accordance with claim 5, wherein:

one of said mounting members is hollow and constitutes a plenum communicating with certain of said conduits, a port in said one mounting member adapted to be connected to a calibration pressure.

7. Apparatus in accordance with claim 5, wherein:

one of said passage means in said mounting member is in communication with a respective said bladder;

said one passage means being adapted to receive bladder-inflating pressure to pinch off a respective row of conduits.

* * * * *